United States Patent [19]

Herb

[11] Patent Number: 4,659,270

[45] Date of Patent: Apr. 21, 1987

[54] EXPANSION DOWEL FORMED OF AN EXPANSION SLEEVE AND A WEDGE-SHAPED EXPANSION ELEMENT

[75] Inventor: Armin Herb, Peissenberg, Fed. Rep. of Germany

[73] Assignee: Hilti Aktiengesellschaft, Fürstentum, Liechtenstein

[21] Appl. No.: 809,945

[22] Filed: Dec. 17, 1985

[30] Foreign Application Priority Data

Dec. 17, 1984 [DE] Fed. Rep. of Germany ....... 3445963

[51] Int. Cl.$^4$ ............................................. F16B 13/04
[52] U.S. Cl. ....................................... 411/40; 411/60; 403/297
[58] Field of Search ............................ 403/297, 409.1; 411/40–43, 48, 60

[56] References Cited

U.S. PATENT DOCUMENTS 2,108,842 2/1938 Bazzoni ................................. 411/41
3,974,735 8/1976 Berner .................................. 411/41
4,147,444 4/1975 Herb et al. .

FOREIGN PATENT DOCUMENTS 127529 11/1945 Australia ................................ 411/41

*Primary Examiner*—Andrew V. Kundrat
*Attorney, Agent, or Firm*—Toren, McGeady and Goldberg

[57] ABSTRACT

A metal expansion dowel is made up of an axially elongated cylindrically shaped expansion sleeve and an expansion element formed monolithically with the sleeve. The expansion sleeve has a leading end and a trailing end. The sleeve has an opening with the opposite edge surfaces extending in the axial direction converging toward the leading end. The expansion element is located in the opening and is secured to the sleeve by a separable web. The expansion element is wedge-shaped and narrows in the leading end direction. An inwardly projecting stop is formed in the expansion element. When an axial force is directed toward the leading end against the stop, the web is separated from the sleeve and the expansion element is displaced axially toward the leading end of the sleeve moving along the opposite edge surfaces of the opening and widening the sleeve. Due to the converging arrangement of the opposite edge surfaces of the recess, the dowel has a post-expansion characteristic during subsequent axial loading of the expansion sleeve after it is anchored in place.

6 Claims, 8 Drawing Figures

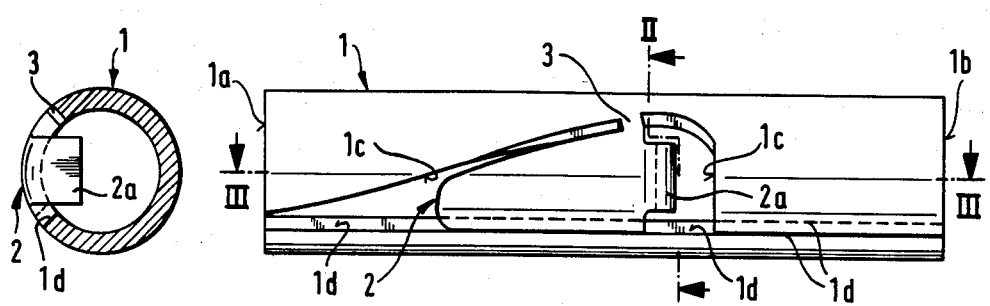
Fig. 2
Fig. 1
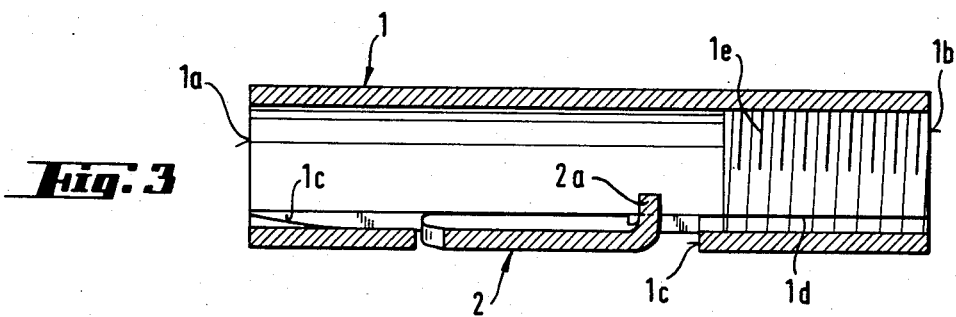
Fig. 3
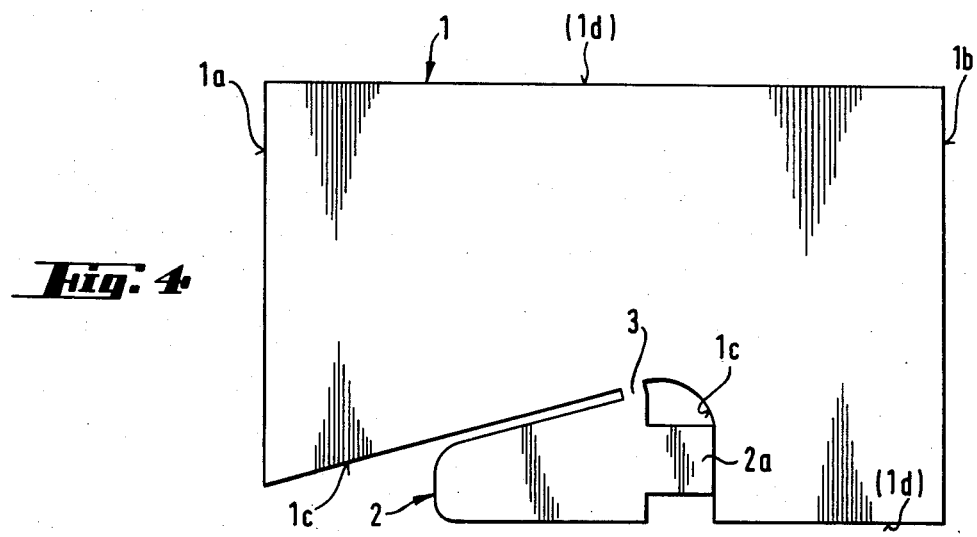
Fig. 4

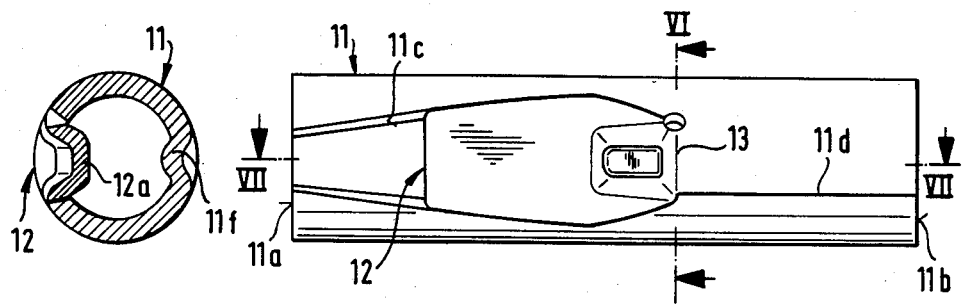
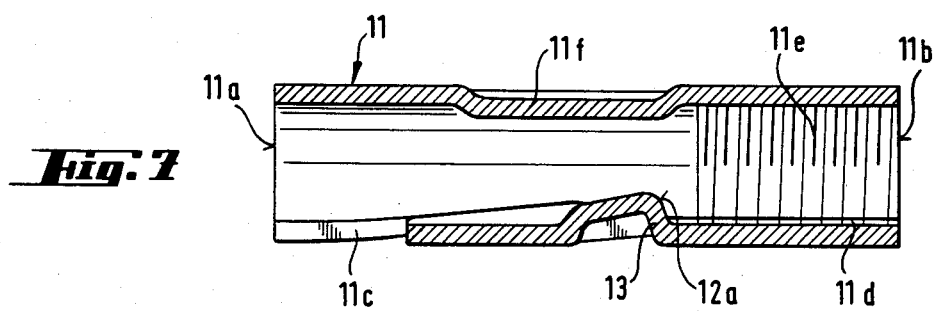
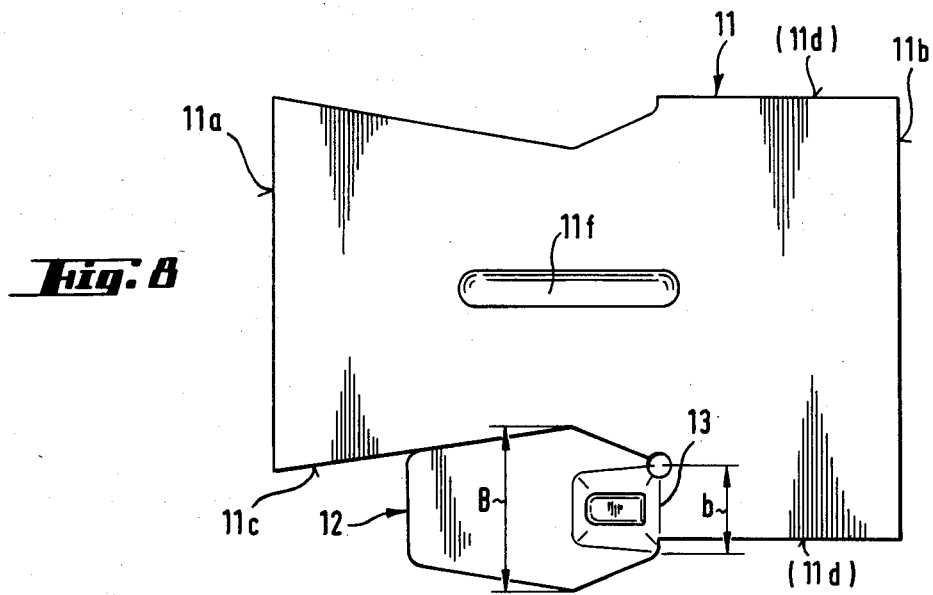

EXPANSION DOWEL FORMED OF AN EXPANSION SLEEVE AND A WEDGE-SHAPED EXPANSION ELEMENT

BACKGROUND OF THE INVENTION

The present invention is directed to an expansion dowel made up of a cylindrically shaped expansion sleeve having a leading end and a trailing end with means for securing a load to the sleeve. The sleeve has an opening extending in the leading end-trailing end direction and the opposite surfaces of the opening converge toward the leading end. A wedge-shaped expansion element shaped to correspond to the opening is supported laterally on the opposite edge surfaces of the opening.

Expansion dowels of the above-described type are used chiefly in the medium and lower load range and preferably are produced from sheet metal by punching or stamping and rolling procedures. Such dowels meet the requirements for resistance to fire and, therefore, are used to an increasing degree instead of the previously conventional plastics material dowels. Because of their great use, such dowels must be produced at low cost. Another feature of such dowels relative to plastics material dowels is that they have a post-expansion characteristic.

One known metal expansion dowel of this general type includes an expansion sleeve with an opening having opposite edge surfaces narrowing toward the leading end of the sleeve and a correspondingly wedge-shaped expansion element. The expansion sleeve and the expansion element are produced separately and must be assembled and connected to one another by a separate means until the dowel unit is placed in a borehole. The production of such an expansion dowel results in high manufacturing costs and makes the dowel much more expensive than a comparable plastics material dowel.

SUMMARY OF THE INVENTION

Therefore, the primary object of the present invention is to provide a metal expansion dowel having the above-mentioned advantages with regard to the plastics material dowels and which, in addition, can be produced economically and are simple and safe to use.

In accordance with the present invention, the expansion element is secured to the expansion sleeve by a separable member with a predetermined separating action.

The predetermined separable member secures the expansion element to the expansion sleeve until the commencement of the expansion procedure and the strength of the separable member can be kept low, since it must be able to be broken or separated by the user during the placement of the dowel when the expansion element is displaced axially relative to the sleeve.

The predetermined separable member, as such, can be formed as a soldered, welded or adhesive connection, however, for affording economical production of the dowel, it is preferable if the separable member is constructed as a web which monolithically connects the expansion element with the expansion sleeve. Accordingly, the expansion sleeve and the expansion element can be punched out of the same piece of material in the same step. As a result, material as well as working time can be saved, since the amount of material or waste punched out can be reduced. The subsequent operation in forming the dowel can also be simplified, for example, the expansion sleeve along with the expansion element can be rolled into a cylindrically shaped member all in one operation. A possible application of surface protection can be applied in the same work step.

Basically, the separable web can be located at various places on the expansion element. Advantageously, and particularly for effecting the separation of the web during the placing procedure, the web can be located in the region of the edge surfaces of the opening. With this arrangement the separable web can be sheared off as the expansion element is separated from the expansion sleeve. The required shearing forces for the separable web can be determined relatively exactly. Accordingly, the separable web can be dimensioned so that the force required for breaking the web lies within a predetermined range.

To prevent an oblique movement of the expansion element while the separable web is broken, it is preferable to locate the separable web in the trailing end region of the expansion element. The web can be formed as a weakened section. According to the configuration of the separable web, it can be sheared off or broken off by applying a tensile force.

In addition, the required breaking off or shearing off cross-section can be distributed between a plurality of separable webs arranged at the trailing end region of the expansion element.

During its production, the dowel is preferably punched out of a planar piece of sheet metal and then rolled to form a sleeve-like member. The expansion element is also provided with a curved shape corresponding to the radius of the expansion sleeve. To facilitate the formation of the sleeve-like dowel, the separable web extends in the circumferential direction along the trailing end of the expansion element. The cross-section of the separable web can extend along the entire trailing end of the expansion element or it can have a reduced width compared to the width of the trailing end by suitably shaping the end, such as providing openings, recesses or the like.

One preferable arrangement is to dimension the trailing end of the expansion element where the separable web is located so that the web is smaller in the circumferential direction than the dimension of the expansion element spaced axially from the trailing end of the wedge-shaped element. Accordingly, the widest dimension on the expansion element transversely of the axial direction is not at its trailing end but is located approximately midway between the trailing end and the leading end of the expansion element. The expansion element can have a wedge-shaped configuration extending from its widest point both toward the leading and trailing ends. With such an arrangement of the expansion element, it is possible to reduce the width of the opening in the expansion sleeve in the trailing end direction. With such an arrangement, the cross-section of the expansion sleeve is increased and this is of considerable importance especially when the expansion sleeve is provided with an internal thread. Notch effects may be prevented to a great extent by providing a corresponding shaping of the recess, for example, by rounding the corners of the recess.

To expand the dowel or expansion sleeve after the destruction of the predetermined separable web, the expansion element must be axially displaced relative to the expansion sleeve. Such displacement can be effected by applying a tensile or pulling force on the expansion sleeve. To achieve such a relative axial displacement, the expansion element must project radially outwardly with respect to the expansion sleeve and must be supported in a barb-like manner at the borehole surface and such an arrangement may be a problem because of borehole tolerances. Therefore, it is advantageous for a simple expansion of the dowel to form the separable web making up the predetermined separable section as a stop member projecting inwardly from the inner surface of the sleeve. With such an arrangement, the expansion of the dowel is effected by an axially extending mandrel or pin-like shank introduced into the expansion sleeve so that it contacts the stop member. When a force acting in the axial direction is directed against the stop member, such as by a number of blows produced manually or by a work tool such as a drill hammer or the like, the separable web is broken or sheared off and the expansion element is then displaced in the axial direction toward the leading end with a radial widening of the expansion sleeve.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a side view of an expansion dowel embodying the present invention;

FIG. 2 is a transverse cross-sectional view through the dowel taken along the line II—II in FIG. 1;

FIG. 3 is an axially extending sectional view of the dowel displayed in FIGS. 1 and 2 taken along the line III—III;

FIG. 4 is a developed view of the dowel as shown in FIGS. 1, 2 and 3;

FIG. 5 is a side view of another embodiment of an expansion dowel incorporating the present invention;

FIG. 6 is a transverse cross-sectional view through the dowel shown in FIG. 5 and taken along the line VI—VI;

FIG. 7 is an axially extending sectional view through the dowel taken along the line VII—VII in FIG. 5; and FIG. 8 is a developed view of the dowel illustrated in FIGS. 5 to 7.

DETAILED DESCRIPTION OF THE INVENTION

As shown in FIGS. 1-4, an expansion dowel is formed of an axially elongated cylindrically shaped expansion sleeve 1 and an expansion element 2. As viewed in FIGS. 1, 3 and 4, the left-hand end of the expansion sleeve and the expansion element is the leading end and the right-hand end is the trailing end, that is, the leading end is inserted first when the dowel is placed in a borehole or opening in which it is to be anchored. Accordingly, expansion sleeve 1 has a leading end 1a a and a trailing end 1b. Further, the expansion sleeve has an opening 1c extending in the axial direction with the opening narrowing toward the leading end, that is, the opposite edge surfaces of the opening converge toward the leading end. Since the expansion sleeve 1 is rolled from a piece of sheet metal, it has an axially extending slot 1d extending along its axial length. Note the surfaces or edges forming the slot 1d as shown in FIG. 4. To prevent a widening of the expansion sleeve the ends of the longitudinal slot 1d can be connected to one another, such as by soldering or welding. The expansion element 2 is formed in a wedge-shaped manner corresponding to the shape of the opening 1c and is supported by the edge surfaces of the opening. The expansion element 2 is formed monolithically with the expansion sleeve and is connected to it by a destructible separable web 3. As shown best in FIG. 4, the expansion element 2 and the expansion sleeve 1 can be produced in a single work step, such as from a piece of sheet metal. To break or separate the web 3 and to axially displace the expansion element 2 for expanding the sleeve 1, by an expansion tool, not shown, the expansion element is provided with a stop member 2a projecting radially inwardly into the bore formed through the expansion sleeve 1. At its trailing end, the expansion sleeve has an internal thread 1e for effecting a connection to the dowel.

Another embodiment of the expansion dowel embodying the present invention is set forth in FIGS. 5 to 8 and includes an axially elongated cylindrically shaped expansion sleeve 11 and an expansion element 12. As compared to the embodiment shown in FIGS. 1-4, the expansion element 12 is formed generally symmetrically. A separable web 13 connects the expansion element 12 to the expansion sleeve 11 at the trailing end of the expansion element and the web has a length extending in the circumferential direction of the dowel. Expansion sleeve 11 also has an axially extending slot 11d for use in the production of the sleeve. Adjacent its trailing end, the expansion sleeve has an internal thread 11e. As can be seen in FIG. 8, the dimension "b" at the trailing end of the expansion element 12 forming the separable web 13 extending in the circumferential direction of the dowel is smaller than the dimension "B" extending in the circumferential direction and located approximately midway between the trailing end and the leading end of the expansion element. Accordingly, expansion element 12 is shaped in a wedge-shaped manner from the maximum dimension "B" extending toward both the leading end 11a and the trailing end 11b of the expansion sleeve 11. With a corresponding shape of the opening 11c the maximum reduction in the cross-section of the sleeve is not located at the trailing end of the recess 11c. Accordingly, the region of the expansion sleeve weakened or reduced by the internal thread 11e is prevented from separating during axial loading of the dowel. The expansion element 12 is provided with an inwardly deformed section 12a adjacent the separable web 13.

As shown particularly in FIG. 7, the separable web 13 includes a local material weakened section. Separable web 12, however, is also formed as a stop member 12a projecting into the bore extending through the expansion sleeve. For expanding the dowel and breaking or shearing off the separable web 13, a stud-shaped expansion tool, now shown, is inserted into the bore through the expansion sleeve until it contacts the stop member 12a. To guide the expansion tool, the expansion sleeve is provided on the side opposite the opening 11c with an axially extending inwardly directed projection 11f. After the web 13 is separated, the expansion element is displaced axially by the application of a number of blows transmitted through the expansion tool or by the application of axial pressure with the axial movement of the element 12 effecting a radial widening of the expansion sleeve at the leading end 11a thereof. During such expansion, the expansion element 12 is pressed radially outwardly against the borehole surface into which the dowel is inserted by the axially extending edge surfaces of the recess 11c. When an axial loading is applied to the expansion sleeve 11, pulling the sleeve out of the borehole, a post-expansion takes place.

While specific embodiments of the invention have been shown and described in detail to illustrate the application of the inventive principles, it will be understood that the invention may be embodied otherwise without departing from such principles.

I claim:

1. Expansion dowel comprising an axially elongated cylindrically shaped expansion sleeve having a leading end and a trailing end with the leading end being inserted first in a borehole into which the dowel is to be anchored, means at said trailing end for applying a load to said sleeve, and an opening in said sleeve extending in the axial direction thereof and said opening having a pair of opposite edge surfaces extending generally in the axial direction of said sleeve with said edge surfaces converging toward one another toward the leading end, an expansion element located in said opening and said expansion element being wedge-shaped and narrowing toward the leading end of said sleeve, said expansion element being supported in the axial direction by the axially extending edge surfaces of said opening, wherein the improvement comprises that said expansion element is connected to said expansion sleeve by a separable member having a predetermined separation characteristic, said expansion sleeve and expansion element are formed of a metallic material, said separable member is a separable web monolithically connecting said expansion element to said expansion sleeve, and said separable web is located at the trailing end of said expansion element.

2. Expansion dowel, as set forth in claim 1, wherein said expansion sleeve has a circumferential direction and said separable web extends in the circumferential direction along the trailing end of said expansion element.

3. Expansion dowel, as set forth in claim 2, wherein said separable web includes a stop member projecting inwardly into the interior of said expansion sleeve.

4. Expansion dowel, as set forth in claim 3, wherein said expansion sleeve includes an axially extending inwardly directed projection located opposite said expansion element.

5. Expansion dowel, as set forth in claim 1, wherein the dimension of the trailing end of said expansion element extending in the circumferential direction of said sleeve is less than the circumferential direction of said expansion element at a position spaced in the axial direction from the trailing end of said expansion element and located between the leading end and the trailing end of said expansion element.

6. Expansion dowel, as set forth in claim 1, wherein said expansion sleeve and said expansion element are punched monolithically from a single piece of sheet metal.

* * * * *